United States Patent
Petkov et al.

(10) Patent No.: US 8,156,464 B2
(45) Date of Patent: Apr. 10, 2012

(54) METHOD AND SYSTEM FOR AUTOMATIC GENERATION OF PROCESSOR DATAPATHS

(75) Inventors: Darin Stamenov Petkov, San Jose, CA (US); David William Goodwin, Los Altos, CA (US); Dror Eliezer Maydan, Palo Alto, CA (US)

(73) Assignee: Tensilica, Inc., Santa Clara, CA (US)

( * ) Notice: Subject to any disclaimer, the term of this patent is extended or adjusted under 35 U.S.C. 154(b) by 945 days.

(21) Appl. No.: 12/111,153

(22) Filed: Apr. 28, 2008

(65) Prior Publication Data

US 2008/0209181 A1 Aug. 28, 2008

Related U.S. Application Data

(62) Division of application No. 11/313,231, filed on Dec. 19, 2005, now Pat. No. 7,590,964.

(51) Int. Cl.
*G06F 17/50* (2006.01)
(52) U.S. Cl. .......................... 716/113; 716/104; 716/136
(58) Field of Classification Search .................. 716/104, 716/113, 136
See application file for complete search history.

(56) References Cited

U.S. PATENT DOCUMENTS 6,651,222 B2 * 11/2003 Gupta et al. ................. 716/102

* cited by examiner

*Primary Examiner* — Thuan Do
(74) *Attorney, Agent, or Firm* — Pillsbury Winthrop Shaw Pittman LLP

(57) ABSTRACT

Systems and method for automatically generating a set of shared processor datapaths from the description of the behavior of one or more ISA operations is presented. The operations may include, for example, the standard operations of a processor necessary to support an application language such as C or C++ on the ISA. Such operations, for example, may represent a configurable processor ISA. The operations may also include one or more extension operations defined by one or more designers. Thus, a description of the behaviors of the various standard and/or extension operations that compose the ISA of an instance of a standard or configurable processor is used to automatically generate a set of shared processor datapaths that implement the behavior of those operations. In addition, certain aspects may take one or more operations as well as one or more input semantics and either re-implement the input semantics automatically, or combine the input semantics with each other or with one or more other operations to automatically generate a new set of shared processor datapaths.

19 Claims, 8 Drawing Sheets

METHOD AND SYSTEM FOR AUTOMATIC GENERATION OF PROCESSOR DATAPATHS

CROSS REFERENCE TO RELATED APPLICATIONS

This application is a divisional of U.S. patent application Ser. No. 11/313,231 filed on Dec. 19, 2005, now U.S. Pat. No. 7,590,964, the contents of which are incorporated herein by reference.

BACKGROUND OF THE INVENTION

Generally, the present invention relates to the design of integrated circuits. More specifically, the present invention relates to a system for the automatic generation of processor datapaths.

It is typically known in the art that an Instruction Set Architecture (ISA) describes the instructions, operations, register files, encoding/decoding logic, and/or field assignments of a processor that are made visible to the programmer. A processor can include any type of integrated circuit capable of carrying out these types instructions, operations, register files, encoding/decoding logic, and/or field assignments. A processor that implements an ISA must contain hardware logic that implements the behavior of each operation in the ISA. It is known in the art that an efficient processor implementation typically contains one or more datapaths. Each datapath contains hardware logic that implements the behavior of a subset of the ISA operations. Within a datapath, logic blocks that are required to implement the behavior of two or more operations are often shared, so that the logic area of the datapath is reduced.

A configurable processor, such as the Xtensa processor from Tensilica, Inc. of Santa Clara, Calif., for example, allows the designer to extend an existing ISA with new designer-defined operations. For an efficient implementation of the configurable processor, the behavior of each designer-defined operation will typically be implemented by a shared datapath. For the most efficient configurable processor implementation, it may be necessary to implement the behavior of one or more existing ISA operations and one or more designer-defined operations with the same datapath.

Determining the number of datapaths and the logic sharing within those datapaths for a set of operations typically requires that the designer manually perform a number of tasks that are difficult and time-consuming. Also, introducing a new operation into the ISA may require the designer to reconsider the existing datapaths and logic sharing; because the new operation may significantly change the manner in which the datapaths and logic sharing should be implemented to provide the most efficient hardware implementation. Thus, there is need in the art for a system that, given one or more operations that have separately described behaviors, can automatically create one or more datapaths containing shared logic such that the hardware logic efficiently implements the behavior of those one or more operations.

For example, consider an ISA that contains an addition (ADD), subtraction (SUB), and multiplication (MUL) operation. It is typically know in the art that a processor can implement the behavior of an ADD and SUB operation by sharing a single hardware adder. Thus, one potential implementation of an ISA containing an ADD, SUB, and MUL operation requires the creation of two datapaths; one datapath implements the behavior of the ADD and SUB operations using shared adder logic and the other datapath implements the behavior of the MUL operation using multiplication logic. It is also known in the art that a processor can implement the behavior of a MUL operation with hardware logic that performs a partial-products calculation followed by adder logic. Thus, another potential implementation of an ISA containing an ADD, SUB, and MUL operation requires the creation of a single datapath that implements the behavior of all three operations. The datapath contains the partial-products logic followed by adder logic. The adder logic is shared by all three operations.

Creating a set of datapaths that efficiently implements the behavior of a set of operations typically requires that the designer manually identify common hardware resources that can be shared. A hardware resource is a block of logic that should be considered for sharing. The set of resources depends on the behavior of the operations. The designer must carefully choose resources to allow for maximum sharing. For example, if the operations are a 32-bit ADD and a 32-bit MUL, the designer could create a resource to represent 32-bit multiplier logic and another resource to represent 32-bit adder logic. With these resources, no hardware would be shared between the operations. On the other hand, the designer could create a resource to represent 32-bit multiply-partial-products logic and another resource to represent 32-bit adder logic. With these resources, the 32-bit adder logic can be shared between the operations, resulting in a more efficient implementation. Thus, to enable automatic generation of processor efficient datapaths, there is need in the art for a system that can automatically determine the hardware resources required for a set of operation behaviors.

In a pipelined processor implementation, the pipeline stage to which each hardware resource is assigned influences the amount of logic sharing possible in the datapath. If the designer specifies a long clock period, then more logic can be placed into a single stage, resulting in more potential logic sharing. Assume for the ADD/SUB/MUL example from above that the designer manually specifies a clock period that is long enough to allow each operation's behavior to be implemented in a single pipeline stage. Then, the adder logic used to implement the ADD, SUB, and partial-products add for the MUL can be placed in stage one and shared by all three operations. However, consider the case where the designer chooses a shorter clock period that requires the MUL's partial-products logic to occupy stage one and the MUL's adder logic to occupy stage two. In this case, there are several possible implementations that trade off application performance versus hardware logic area. Two of the typical pipelined processor implementations for this example are described below.

In the first implementation, the MUL's adder logic is shared with the ADD and SUB operation adder logic by increasing the latency of the ADD and SUB operation by one cycle, so that a single datapath implements all three operations. The datapath has a single copy of partial-products logic in stage one and a single copy of adder logic in stage two. This implementation increases the latency of the ADD and SUB operation by one cycle and so may cause an increase in the number of cycles required to execute an application.

In the second implementation, the latency of the ADD and SUB operation is not increased. Thus, the adder logic of the ADD and SUB in stage one cannot be shared with the adder logic of the MUL operation in stage two. This implementation requires two datapaths, one for the ADD and SUB, and one for the MUL. Thus, compared with the first implementation, this implementation requires an additional implementation of the adder logic. In exchange for the additional logic, the ADD and SUB operation have shorter latency than in the first implementation, which can potentially lead to a decrease in the number of cycles required to execute an application compared to the first implementation.

As this example shows, there is need in the art for a system that can automatically assign hardware resources to pipeline stages so that shared datapath logic can be efficiently implemented, while observing designer specified constraints such as target clock period and operation latency.

Typically, when determining the hardware resources for the datapath(s) associated with one or more operations, the designer must manually weigh the timing and area characteristics of the logic represented by the resource. The area characteristics of a resource will determine if it is large enough to consider for sharing. The timing characteristics of a resource will determine how sharing it will affect the latency of the operations that use the resource. Thus, there is need in the art for a system that can automatically determine the timing and area characterization of hardware resources derived from operation behaviors.

Logic synthesis systems, such as those described in "Behavioral Synthesis: Digital System Design Using the Synopsys Behavioral Compiler" by David Knapp, and "The Synthesis Approach to Digital System Design" by P. Michel, U. Lauther, and P. Duzy, can potentially perform resource sharing of blocks of hardware logic. However, these logic synthesis systems do not operate on the behaviors of ISA operations for the specific purpose of producing datapaths in a pipelined processor implementation. Therefore, these systems are unable to exploit information about the processor pipeline context to produce more efficient hardware.

For example, in the context of ISA operation behaviors being implemented in a processor pipeline, the behaviors of an operation that performs addition through an ADD resource and an operation that performs subtraction through a SUBTRACT resource can be implemented through a shared ADD/SUBTRACT resource. Existing logic synthesis systems cannot share hardware resources across operations in this manner automatically because those systems do not exploit the knowledge that in the processor pipeline context the ADD and the SUBTRACT resources are never active in the same cycle.

Similarly, in the context of ISA operation behaviors being implemented in a processor pipeline, the implementation of an operation behavior can be changed by varying the number of pipeline stages required for its implementation or by sharing hardware resources across multiple stages of the implementation. These processor design optimizations alter the latency of the operation and create pipeline hazards that potentially affect the performance of an application using the operation, but do not change the functionality of the operation. Existing logic synthesis systems cannot automatically share resources across stages or automatically vary the number of pipeline stages in this manner because those systems do not exploit knowledge of the processor pipeline context.

Therefore, to summarize, what is needed in the art is an automated datapath generation flow that allows the designer to produce one or more shared processor datapaths that implement the behaviors of a set of operations, such that designer-specified constraints like, for example, target clock period and operation latency are satisfied.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION

Figure 1:
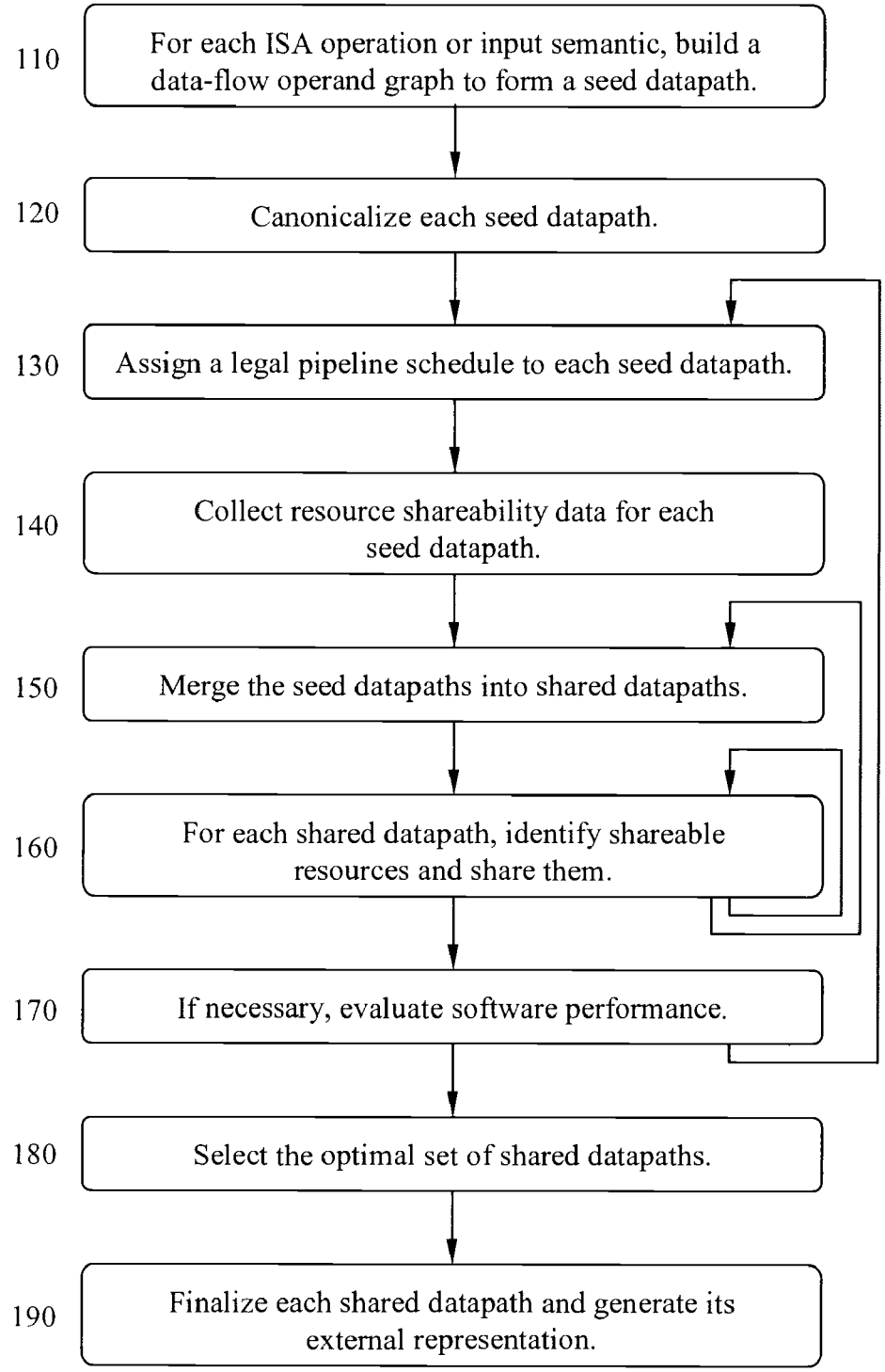
FIG. 1 illustrates a flowchart according to certain embodiments of the present invention.

The present invention will now be described in detail with reference to the drawings, which are provided as illustrative examples of the invention so as to enable those skilled in the art to practice the invention. Notably, the figures and examples below are not meant to limit the scope of the present invention. Where certain elements of the present invention can be partially or fully implemented using known components or steps, only those portions of such known components and steps that are necessary for an understanding of the present invention will be described, and the detailed descriptions of other portions of such known components and steps will be omitted so as not to obscure the invention. The present invention encompasses present and future known equivalents to the components referred to herein by way of illustration. In the present specification, an embodiment showing a singular component should not necessarily be considered as preventing the invention from encompassing the use of a plurality of that same component, and vice-versa, unless explicitly stated otherwise herein. Moreover, applicants do not intend for any term in the specification or claims to be ascribed an uncommon or special meaning unless explicitly set forth as such.

In certain embodiments of the present invention, both an ISA and a set of datapaths are described using, for example, the Tensilica Instruction Extension (TIE) language from Tensilica, Inc. of Santa Clara, Calif. The TIE language and TIE language extensions as disclosed in the following U.S. patents and U.S. patent applications describe constructs that facilitate an ISA to be specified (all of which are fully incorporated herein by reference):

1. U.S. Pat. No. 6,477,683, entitled "Automated Processor Generation System for Designing a Configurable Processor and Method for the Same";
2. U.S. Pat. No. 6,477,697, entitled "Adding Complex Instruction Extensions Defined in a Standardized Language to a Microprocessor Design to Produce a Configurable Definition of a Target Instruction Set, and HDL Description of Circuitry Necessary to Implement the Instruction Set, and Development and Verification Tools for the Instruction Set";

3. U.S. patent application Ser. No. 10/146,655, entitled "Method and Apparatus for Adding Advanced Instructions in an Extensible Processor Architecture"; and
4. U.S. patent application Ser. No. 10/922,125, entitled "System and Method For Automatic Conversion of a Partially-Explicit Instruction Set to an Explicit Instruction Set".

The TIE reference and operation constructs allow the behavior for each individual operation to be specified. A semantic construct allows the behavior of operations to be specified using a datapath with shared logic. The following example shows the TIE description of a multiply (MUL) operation and a multiple-accumulate (MAC) operation. The example shows how the semantic construct enables the description of a datapath implementation that shares a single multiplier for the two operations. Using the semantic description to implement the behavior of the MUL and MAC operation requires a single multiplier, whereas using the operation descriptions to implement the behavior of the MUL and MAC operations separately would require two multipliers.

```
operation MUL { out AR a, in AR b, in AR c } { }
{
    assign a = b * c;
}
operation MAC { inout AR a, in AR b, in AR c } { }
{
    assign a = a + b * c;
}
semantic msem { MUL, MAC }
{
    wire [31:0] t = b * c;
    assign a = MUL ? t : (a + t);
}
```

In certain embodiments of the present invention, the system automatically creates and merges datapaths by taking input reference, operation and semantic constructs in, for example, the TIE language and automatically creating new or modified TIE semantic constructs containing shared logic such that the hardware logic efficiently implements the operation behaviors. As will be readily apparent to one of ordinary skill in the art, the methods and systems described herein can be applied to ISAs and datapaths described using alternative methods, systems and languages, all of which are intended to be within the scope of the present invention.

The invention takes the description of the behavior of one or more ISA operations and automatically generates a set of shared processor datapaths. The operations may include, for example, the standard operations of a processor necessary to support an application language such as C or C++ on the ISA. Such operations, for example, may represent a configuration of the Xtensa ISA from Tensilica, Inc. of Sunnyvale, Calif. The operations may also include one or more extension operations defined by one or more designers. Thus the invention takes a description of the behaviors of the various standard and/or extension operations that compose the ISA of an instance of a standard or configurable processor and automatically generates a set of shared processor datapaths that implement the behavior of those operations. In addition, the invention may take one or more operations as well as one or more input semantics and either re-implement the input semantics automatically, or combine the input semantics with each other or with other operations to automatically generate a new set of shared processor datapaths.

In certain embodiments, the present invention generates a set of shared processor datapaths by performing the steps of method 100 as illustrated in FIG. 1. The steps shown in FIG. 1 are as follows (each of which is discussed in further detail below):

1. For each ISA operation or input semantic, build a data-flow operand graph to form a seed datapath (step 110);
2. Canonicalize each seed datapath; (step 120)
3. Assign a legal pipeline schedule to each seed datapath (step 130);
4. Collect resource shareability data for each seed datapath (step 140);
5. Merge seed datapaths into shared datapaths (step 150);
6. For each shared datapath, identify shareable resources and share them (step 160), repeat this step until the most efficient implementation of each shared datapath is achieved;

If searching exhaustively over the possible seed datapath mergers, repeat steps 150 and 160 to find the most efficient set of shared datapaths;

7. If necessary, evaluate software performance (step 170); Repeat steps 130 through 180 to trade-off between hardware area and software performance;
8. Select the optimal set of shared datapaths given an optimization goal (step 180); and
9. Finalize each shared datapath and generate its hardware description (step 190).

1. Seed Datapaths

Initially, in step 110, the shared datapath generation system creates a seed datapath based on the behavior of each operation, or based on a shared datapath description or input semantic provided explicitly by the designer. Additionally, a seed datapath may represent a portion of a shared datapath description or input semantic provided explicitly by the designer that may be required for the implementation of an individual operation. This datapath portion can be derived automatically by using the datapath specialization techniques described below. Each seed datapath is an integral part of a processor pipeline, fully aware of the processor interfaces and pipeline signals. The seed datapath combines the internal representation of datapath logic with timing, area and shareable resource information to be used in the subsequent shared datapath generation process. Each seed datapath is optimized using various logic simplification algorithms such as, for example, constant and copy propagation, common sub-expression elimination, and dead-logic elimination.

In certain embodiments of the present invention, the behavior of ISA operations is described through TIE operation, reference and semantic constructs, and datapaths are represented internally through data-flow operand graphs. These two concepts are further described in detail below.

Hardware Description of ISA Operations

In certain embodiments of the present invention, ISA operations are described through TIE operation, reference and semantic constructs. Each operation or reference construct describes a single ISA operation behavior, while each semantic construct describes a datapath that implements the behavior of one or more ISA operations. For example, the behavior of ISA operations MUL and MAC can be described individually through operation constructs (operation MUL and operation MAC), or a datapath that implements the behavior of both operations can be described with a shared semantic construct (semantic msem). The body of each operation, reference or semantic construct can be described, for example, using a subset of the Verilog language. The body can read and write processor signals that the ISA operation has access to, such as register, immediate and state operands, as well as processor interfaces.

For the TIE language, in addition to the basic logic operators such as + and *, designers can use a set of higher level logic constructs (i.e., modules) to describe the behavior of an operation. These operators and modules are also available when describing datapaths. The following list shows some of the modules available in the certain embodiments. One skilled in the art will recognize that many additional modules can be defined, all of which are intended to be within the scope of the present invention.

```
Synopsis:
    sum = TIE_ADD(a, b, cin)
Definition:
    sum = a + b + cin
Synopsis:
    sum = TIE_ADDN(A₀, A₁, ... , A_{n-1})
Definition:
    sum = A₀ + A₁ + ... + A_{n-1}
Synopsis:
    { lt, le, eq, ge, gt } = TIE_CMP(a, b, signed)
Definition:
    lt = (a < b)
    le = (a <= b)
    eq = (a == b)
    ge = (a >= b)
    gt = (a > b)
Synopsis:
    o = TIE_MAC(a, b, c, signed, negate)
Definition:
    o = negate ? c − a * b : c + a * b
Synopsis:
    prod = TIE_MUL(a, b, signed)
Definition:
    prod = a * b
Synopsis:
    { p0, p1 } = TIE_MULPP(a, b, signed, negate)
Definition:
    p0 + p1 = negate ? − a * b : a * b
Synopsis:
    o = TIE_SHIFT_LEFT(v, amt, esize)
Definition:
    p = v << (amt * esize)
Synopsis:
    o = TIE_SHIFT_RIGHT(v, amt, esize)
Definition:
    o = v >> (amt * esize)
Synopsis:
    o = TIE_MUX(s, D₀, D₁, ..., D_{n-1})
Definition:
    o = D_s
Synopsis:
    o = TIE_SEL(S₀, D₀, S₁, D₁, ..., S_{n-1}, D_{n-1})
Definition:
    o = (size{S₀} & D₀) | (size{S₁} & D₁ ) | ... (size{S_{n-1}} & D_{n-1})
```

Internal Datapath Representation

In certain embodiments of the present invention, operation, reference and semantic datapath logic is represented internally as a data-flow operand graph (DFOG). A DFOG (D) consists of DFOG nodes (N), input and output operands (Oin and Oout) and edges (E). Each node has zero, one or more input and output operands. An edge connects an output operand of one node (source) to an input operand of another node (sink). Each DFOG node represents a hardware resource—a logic operator such as +, <<, *, &, or a logic module. The DFOG node operands correspond to the operator or module input operands and the operator or module results. Operands have widths equal to the bit size of the data they represent. Each DFOG edge carries a single bit of data and represents data dependence (data flow) between the logic operators and modules. Special shortcut edges are used to represent constant-0 and constant-1 inputs, "don't care" X inputs, unused outputs, as well as inputs and outputs connected to external signals. An operand of width w is connected to w edges—one edge for each data bit.

Figure 2:
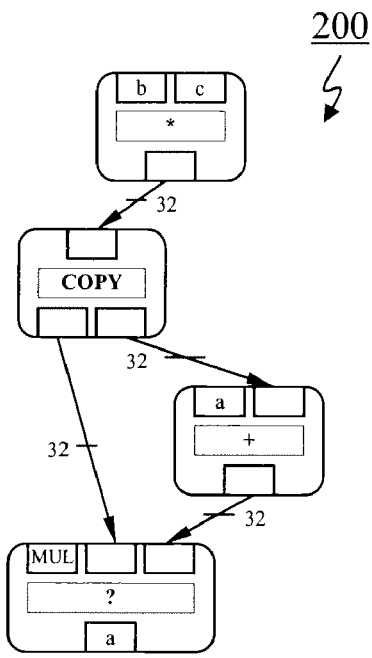
FIG. 2 illustrates a data-flow operand graph representation of semantic msem according to certain embodiments of the present invention.
Figure 3:
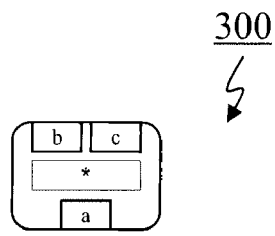
FIG. 3 illustrates a data-flow operand graph representation of operation MUL according to certain embodiments of the present invention.

Similarly, FIG. 3 FIG. 2 illustrates a DFOG 200 that represents semantic msem. As shown in FIG. 2, DFOG 200 contains 4 nodes—one for each logic operator instance (*, +, ?) and a special COPY node. The input operands of each node are shown along the top edge of the node (for example, the ? node has 3 input operands), and the output operands are shown along the bottom edge of the node (for example, the COPY node has 2 output operands). Some of the operands are connected to external signals. For example, the first input operand of the ? node is connected to the MUL decode signal; the input operands of the * are connected to register operands b and c; the output operand of the ? node is connected to register operand a.

The width of the first input operand of the ? node is 1 because each decode signal is 1 bit. The width of all other operands is 32 and there are 32 edges that connect each pair of operands—each edge represents a single data bit. The edge between the output operand of the +node and the third input operand of the ? node shows that the result from the +logic operator is used as the third argument of the ? logic operator. The COPY node is used to replicate the result of the * operator (one copy of the data feeds the + operator, while another copy goes directly into the final ? operator).

illustrates a single node DFOG 300 representation of operation MUL. As shown in FIG. 3, the input operands of the * operator are connected to register operands b and c and the output operand of * is connected to register operand a.

2. Datapath Canonicalization

The process of canonicalization (step 120) can include converting all hardware resources (logic operators and modules or sequences of operators and modules) into a more base form, or canonical form. By converting a resource into a canonical form, one enables sharing of similar resources as well as sharing of portions of resources. In certain embodiments of the present invention, the canonical set of modules includes, for example, TIE_ADDN, TIE_MULPP, TIE_SHIFT_LEFT, TIE_SHIFT_RIGHT, and TIE_CMP. Logic operators and modules that are not made part of one of the canonical modules are considered to already be in their canonical form. Several datapath canonicalization examples follow.

```
Original:
    o = TIE_MAC(m1, m2, acc, sgn, neg)
Canonical:
    { p1, p2 } = TIE_MULPP(m1, m2, sgn, neg)
    o = TIE_ADDN(p1, p2, acc)
Original:
    o = m1 * m2
Canonical:
    { p1, p2 } = TIE_MULPP(m1, m2, 1'b0, 1'b0)
    o = TIE_ADDN(p1, p2)
Original:
    o = v << amt
Canonical:
    o = TIE_SHIFT_LEFT(v, amt, 1)
```

Figure 4:
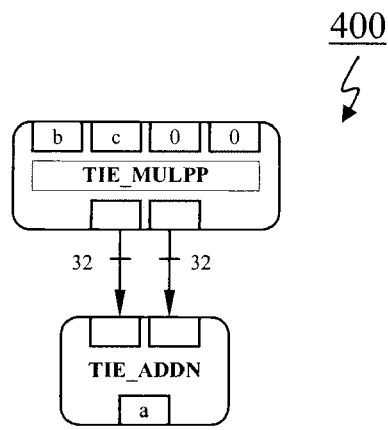
FIG. 4 illustrates a canonical data-flow operand graph representation of operation MUL according to certain embodiments of the present invention.

In certain embodiments of the present invention, datapath logic is represented as a data-flow operand graph. A DFOG that represents datapath logic in its canonical form is called a canonical DFOG. For example, FIG. 3 shows DFOG 300, which represents operation MUL, while FIG. 4 illustrates its canonical version 400. In canonical DFOG 400, the * node is replaced by an equivalent sequence of the canonical nodes TIE_MULPP and TIE_ADDN.

3. Datapath Scheduling

To generate efficient shared datapaths, certain embodiments of the present invention can use hardware constraints, such as, for example, the hardware area and timing characteristics of datapath logic and hardware resources. A characterization database contains hardware area and timing data for each logic operator and module for different operand widths. Storing and retrieving data for all possible operand widths may not be practical given the constraints of the current state of the art (but such future art that may make such all-encompassing storing and retrieving possible is contemplated and meant to be within the scope of the present invention), so an estimation library can be used to approximate the area and timing data for all possible basic hardware resources (logic operators and modules).

In certain embodiments of the present invention, each datapath can be represented as a data-flow operand graph. The system estimates the datapath logic area as the total area of the DFOG. The area $A_N$ of each individual DFOG node N is estimated using the estimation library for the logic operator or module that the node represents. The area $A_D$ of a DFOG D is estimated as the sum total of the areas $A_N$ of the individual DFOG nodes:

$$A_D = \Sigma A_N, N \in D.$$

The semantic generation system needs to assign a legal pipeline schedule to each datapath (step 130). In such a schedule each hardware resource is assigned to a specific pipeline stage. The datapath schedule can be constrained by a target clock period $T_{CLK}$, the timing delays of the hardware resources, as well as the data dependences between the resources. External input and output signals may also impose schedule restrictions. For example, in certain embodiments of the present invention, input processor interfaces are available no earlier than a certain fixed pipeline stage (minimum timing delay), and output processor interfaces need to be ready no later than a certain fixed pipeline stage (maximum timing delay). While immediate operands and decode signals are available early in the pipeline, register file operands cannot be read before the start of the execution stage. Additionally, designers may optionally assign stages to input and output operands through TIE schedule constructs.

Algorithms for datapath timing and scheduling as well as operand and resource scheduling are described below. These algorithms are used to assign a legal pipeline schedule to a datapath (step 130).

Datapath Timing

In certain embodiments of the present invention, datapaths are scheduled by scheduling their DFOG representations. Timing delays are measured as fractions of the target clock period $T_{CLK}$. The timing delay $T_N$ of a node N is estimated using the estimation library propagation delay data for the hardware resource that the node represents, divided by $T_{CLK}$. If an input operand $O_{in}$ is an external signal (e.g., register file operand, state, immediate or interface), its minimum timing delay $T_{Oin}$ is pre-annotated. Otherwise, the timing delay $T_{Oin}$ is either pre-annotated, or estimated, as approximately equal to the maximum timing delay of all output operands $O_{out}$ to which $O_{in}$ is connected:

$$T_{Oin} = \max(T_{Oout}), E_{Oout,Oin} \in D.$$

The timing delay $T_{Oout}$ of an output operand Oout of a node N is estimated as the maximum timing delay of all input operands that belong to N plus the timing delay of N:

$$T_{Oout} = T_N + \max(T_{Oin}), O_{in} \in N.$$

In addition to the estimated timing delay, output operands may have additional timing restrictions. If the estimated timing delay for an output operand $T_{Oout}$ is greater than its pre-annotated, required maximum timing delay, then there is no legal schedule for the DFOG, given the target clock period $T_{CLK}$.

Figure 5:
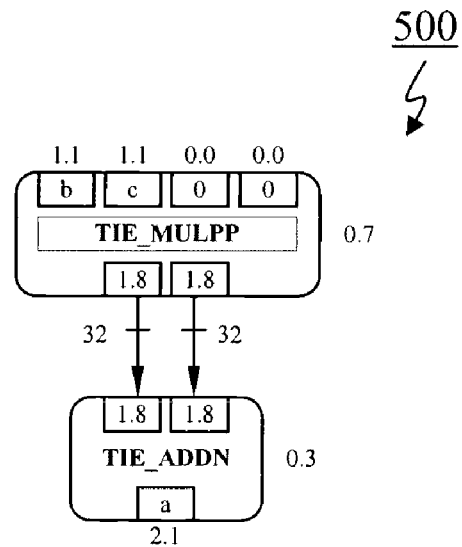
FIG. 5 illustrates a timed canonical data-flow operand graph representation of operation MUL according to certain embodiments of the present invention.

FIG. 5 illustrates a timed version 500 of the canonical DFOG of operation MUL, with original DFOG shown in FIG. 4. The timing delays of the external input operands as well as the constant operands are annotated above the operands. The first two TIE_MULPP input operands are register operands so their minimum delay is early in the execution stage (1.1). The constant operands are available as early as possible (0.0). The propagation delay of the TIE_MULPP node is annotated next to the node (0.7). The minimum delay of the TIE_MULPP output operands (1.8) is calculated by adding the propagation delay of the node (0.7) to the maximum of the input operand timing delays (1.1). The timing delays of the input operands of the TIE_ADDN node are equal to the timing delays of the output operands to which they are connected (1.8). Again, the minimum delay of the TIE_ADDN output operand (2.1) is calculated by adding the propagation delay of the node (0.3) to the maximum of the input operand timing delays (1.8).

Datapath Scheduling

Each logic path that starts from an external input operand or a pipeline register and ends in an external output operand or a pipeline register without passing through any pipeline registers can be referred to as a timing path. In certain embodiments of the present invention, hardware resources in such a datapath can belong to the same pipeline stage. The slowest timing path in a datapath is usually called a critical timing path. The delay of the critical timing path can, for example, determine the minimum required target clock period.

In certain embodiments of the present invention, a special single input, single output FLOP DFOG node is used to represent registers between pipeline datapath stages. Since the FLOP node N represents the start of a new stage (or clock period), the timing delay formula for the FLOP's output operand changes to:

$$T_{Oout} = T_{FLOP}[+T_{Oin}], O_{in} \in N.$$

A legal DFOG schedule is a DFOG schedule that corresponds to a legal datapath schedule. In a legal DFOG schedule, each non-FLOP node has all of its input and output operands available in the same stage, i.e., the node does not cross a stage boundary:

$$\lfloor T_{Oin} \rfloor = \lfloor T_{Oout} \rfloor, O_{in} \in N, O_{out} \in N, N \in D,$$
$$KIND_N \neq FLOP.$$

To create a legal datapath schedule, the datapath scheduler inserts pipeline registers along paths that cross stage boundaries. The datapath optimizer can select a faster hardware implementation for hardware resources that are on the critical timing paths, or break them down into equivalent sequences of hardware resources so that pipeline registers can be placed appropriately. The datapath scheduler should increase the target clock period $T_{CLK}$ if the propagation delay of a datapath resource plus, as applicable, the clock-to-data propagation delay of a pipeline register is longer than one clock cycle ($T_N \geq 1$), or if the timing delay of an output operand connected to an external signal is longer than the required delay.

Figure 6:
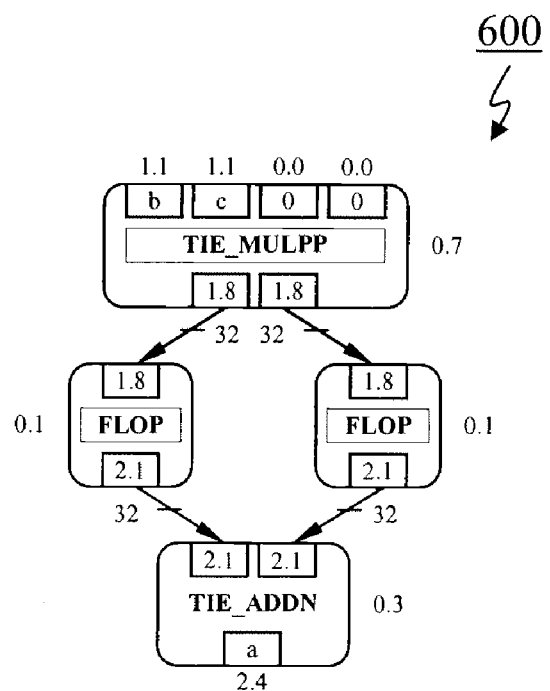
FIG. 6 illustrates a legal scheduled canonical data-flow operand graph representation of operation MUL according to certain embodiments of the present invention.

FIG. 6 illustrates the process of inserting FLOP nodes to create a legal DFOG schedule 600 of the canonical DFOG timed version 500 of FIG. 5. The DFOG schedule of FIG. 5 is not legal because the TIE_ADDN node crosses a stage boundary—its input operands have a delay of 1.8 (i.e., the input operands become available in stage 1), while its output operand has a delay of 2.1 (i.e., the output operand becomes available in stage 2). The DFOG scheduler inserts FLOP nodes to produce DFOG 600 of FIG. 6. In this DFOG, the TIE_MULPP node is entirely in stage 1, and the TIE_ADDN node is entirely in stage 2, while the FLOP nodes form the stage boundary.

Operand Scheduling

The scheduling process described above assumes that all external input operands are available at some pre-annotated stage and all external output operands must be ready by some pre-annotated stage. If instead, some input operands have a minimum use stage and/or some output operands have a maximum def stage, a two-pass timing process (e.g., forward followed by backward) can be used to assign all operands to specific stages. In this process, each output operand with no pre-annotated stage will be defined as early as possible in the pipeline, while each input operand with no pre-annotated stage will be used as late as possible in the pipeline. The selection of pipeline stages for input and output operands can impact the number of software cycles required for the processor to execute a sequence of instructions. Step 190 of the overall algorithm, discussed below, enumerates the possible operand stages for trade-off between hardware area and software performance, as necessary.

The forward and the backward timing passes described below are applied before FLOP nodes are inserted. The process assumes the propagation delay of each node plus the propagation delay of a FLOP node is less than the target clock period. If not, the target clock period is increased appropriately.

In the forward timing pass all external output operands with no pre-assigned stage are assigned to their earliest possible pipeline stage based on the earliest possible stage of the external input operands. This timing pass accounts for insertion of FLOP nodes by using a modified algorithm for computing the timing delay for an output operand Oout of node N:

1. Compute the default timing delay $T_{Oout}$:

$$T_{Oout}=T_N+\max(T_{Oin}), Oin \in N.$$

2. Check if node N crosses a stage boundary:

$$\lfloor \max(T_{Oin}) \rfloor \neq \lfloor T_{Oout} \rfloor, Oin \in N.$$

3. If node N crosses a stage boundary, re-compute $T_{Oout}$:

$$T_{Oout}=\lceil \max(T_{Oin}) \rceil + T_{FLOP} + T_N, Oin \in N.$$

This forward timing process assigns each output operand to its earliest possible stage. If the stage of an output operand is later than the maximum allowed stage for that operand, the target clock period is increased and the forward timing process is repeated.

Once all external output operands are assigned to valid pipeline stages, a backward timing pass assigns each external input operand to its latest possible stage by starting from the datapath output operands and using a modified timing algorithm described below. The timing delay of an input operand Oout is equal to the minimum timing delay of all input operands to which it is connected:

$$T_{Oout}=\min(T_{Oin}), E_{Oout,Oin} \in D.$$

The backward timing algorithm computes the timing delay of input operand Oin by accounting for insertion of FLOP nodes:

1. Compute the default timing delay $T_{Oin}$:

$$T_{Oin}=\min(T_{Oout})-T_N, Oout \in N.$$

2. Check if node N crosses a stage boundary:

$$\lfloor \min(T_{Oout}) \rfloor \neq \lfloor T_{Oin} \rfloor, Oout \in N.$$

3. If node N crosses a stage boundary, re-compute $T_{Oin}$:

$$T_{Oin}=\lfloor \min(T_{Oout}) \rfloor - T_N, Oout \in N.$$

The backward timing process assigns each external input operand to its latest possible stage. Because the forward timing process started with the minimum allowed stage for each input operand, the backward timing process will assign each external operand to a stage that is greater or equal to the minimum allowed one.

Resource Scheduling

In a legal datapath schedule, each hardware resource is assigned to a specific pipeline stage. In certain embodiments of the present invention, the stage of the hardware resource is equal to the stage of the DFOG node that represents that resource. Given a legal DFOG schedule, the pipeline stage $STAGE_N$ of a node N is defined as the integral part of the delay of the output operands of N:

$$STAGE_N=\lfloor T_{Oout} \rfloor, Oout \in N.$$

The datapath scheduler can move resources between pipeline stages in order to reduce area by minimizing the number of pipeline registers used or to enable resource sharing. For example, a 32-bit+operator scheduled at the beginning of pipeline stage S requires two 32-bit pipeline registers for its inputs. If this operator were moved into the preceding pipeline stage S-1, only one 32-bit pipeline register would be required for the operator's result.

Each seed datapath can be scheduled. The scheduler inserts pipeline registers as appropriate to create a legal schedule and adjusts the target clock period if necessary. To create an optimal schedule for the external operands that do not have required delays, a two-pass schedule is used—a forward schedule followed by a backward schedule. This way external input operands are used as late as possible while external output operands are defined as early as possible.

4. Resource Shareability Data

After each seed datapath is canonicalized and scheduled, the system collects resource shareability data for the datapath (step 140). A set of hardware resources in a datapath can be shared if the resources in the set can be replaced by a single resource that, through possible selection of the input and output data based on the opcode decode signals, performs the same logic function as the original resources. Such sets of resources are called shareable resource sets.

In the example below, the original semantic that implements two ISA operations, ADD and SUB, uses two separate hardware resources—one add (+) and one subtract (−). The shared semantic addsub has the same functionality but uses a single shared TIE_ADD resource with appropriate input selection. In this example, the original + and − resources form a shareable resource set.

```
Original:
    semantic addsub { ADD, SUB }
    {
        assign a = TIE_SEL(ADD, b + c, SUB, b − c);
    }
Shared:
    semantic addsub { ADD, SUB }
    {
        wire [31:0] tc = TIE_SEL(ADD, c, SUB, ~c);
        assign a = TIE_ADD(b, tc, SUB);
    }
```

In order to identify shareable resources, the system first identifies one-hot resource sets through datapath specialization as described below.

Datapath Specialization

A datapath can potentially represent the implementation of the behaviors of several ISA operations. Each ISA operation defines a one-bit input decode signal. The set of decode signals obey the one-hot property—at runtime, at most one of the decode signals is set to 1, and the rest are set to 0.

To specialize a datapath for a set of opcodes, OPCODES, means that the datapath is simplified so that only the logic required to implement the opcodes in OPCODES remains. The specialization process generally involves the following steps:

1. Mark all external output operands that are not defined by any opcode in OPCODES as unused;
2. Set all decode signals corresponding to opcodes that do not belong to OPCODES to 0; and
3. If specializing for a single opcode (i.e. if |OPCODES|=1), set its decode signal to 1.
4. Optimize the datapath.

In certain embodiments of the present invention, the datapath is represented as a DFOG. Specializing a datapath is equivalent to specializing a DFOG by initializing the external DFOG operands as described in steps 110 through 130 and optimizing the DFOG. The optimized DFOG represents the specialized datapath.

One-Hot Resource Sets

If a datapath is specialized for a particular opcode, the remaining datapath logic represents the hardware resources that are required by that opcode. These resources form the set of active resources for this opcode. Similarly, if a hardware resource R is active for a particular opcode, then the opcode activates the resources and belongs to its active opcode set OPCODES(R).

A set of hardware resources RSET is a one-hot resource set if each resource in the set is active for a disjoint set of opcodes. That is, RSET is a one-hot resource set if the following condition holds:

OPCODES($R_i$)∩OPCODES($R_j$)=∅, $R_i$≠$R_j$, $R_i$∈RSET, $R_j$∈RSET

One way to determine the set of opcodes that activate a resource is to use formal verification methods. A simpler, more practical way is to mark the resource as "don't touch" for optimization purposes, and to specialize the datapath for each separate opcode. If the resource is not dead (i.e., if its output is used) after specialization for a particular opcode, then the resource is active for this opcode.

Shareable Resources

In order to determine resource shareability, the system should consider one or more of the following factors: resource kinds, one-hot resource set, dependency cycles, pipeline stage, timing and area.

In certain embodiments, resource kinds generally means that the resources to be shared should represent the same or similar logic operators or modules, and the system should know how to generate the shared resource along with the proper input and output data selection. For example, sharing a 3-input and 4-input TIE_ADDN would require to select an extra 0 operand for the opcodes that activate the 3-input TIE_ADDN. Similarly, sharing a 16- and a 32-bit TIE_MULPP may require the inputs of the 16-bit TIE_MULPP to be sign-extended, or conditionally sign-extended, if the signed input's value cannot be determined statically. Sharing a TIE_SHIFT_LEFT with a TIE_SHIFT_RIGHT may require the TIE_SHIFT_LEFT to be converted into an equivalent TIE_SHIFT_RIGHT where the shifted data is properly shifted left first and the shift amount is adjusted; additionally, the shifted data may need to be scattered on the input side and gathered on the output side depending on the shift element bit size.

In certain embodiments, one-hot resource set generally means that the resources can be shareable if they are active for disjoint operations or disjoint sets of opcodes. If the same opcode activates two separate resources in the set, then both results will be required in order to compute the correct final output. Therefore, it is not possible to generate only a single resource in place of the two resources. This restriction can be relaxed by the designer, or if the impact on the software performance is evaluated. In such cases sharing can be achieved by instantiating a shared resource that is used in different stages for the same opcode. This could lead to pipeline resource hazards causing scheduling constraints for that opcode.

Figure 7:
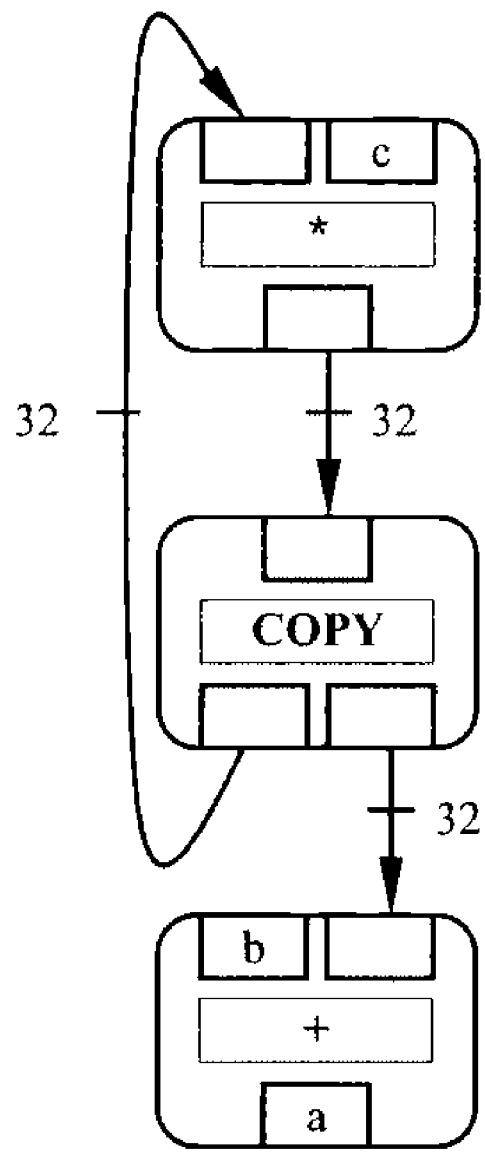
FIG. 7 illustrates a data-flow operand graph with a dependence cycle according to certain embodiments of the present invention.

In certain embodiments, dependence cycles generally means that sharing resources should not create dependence cycles in the datapath. A sample DFOG 700 with a dependence cycle is illustrated in FIG. 7. As shown in FIG. 7, the edge from the first output operand of the COPY node to the first input operand of the * node creates a data dependence cycle between the two nodes. When sharing resources, dependence cycles can be avoided by checking that the reachable resource set of each resource in the set does not contain any of the other resources in the set. The reachable resource set of a resource is defined as the union of all its successor resources and their reachable resource sets.

In certain embodiments, pipeline stage generally means that resources belonging to different pipeline stages should not be shared. This constraint can be relaxed by the designer, or if the impact on the software performance is evaluated. In such cases sharing can be achieved by instantiating a shared resource that is used in different stages for different sets of opcodes. This would lead to pipeline resource hazards causing scheduling constraints between the opcodes. Alternatively, the system can attempt to move resources across stages to facilitate sharing if the datapath schedule allows that.

Figure 8:
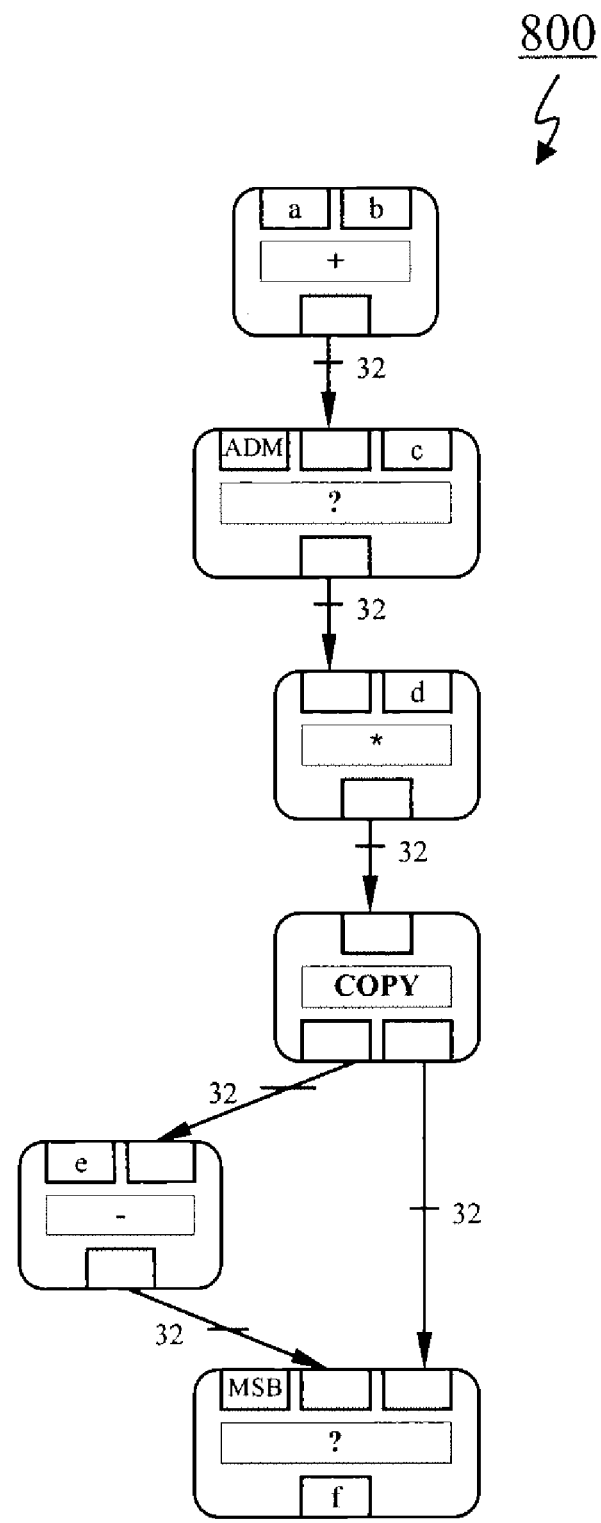
FIG. 8 illustrates a data-flow operand graph with a false dependence path according to certain embodiments of the present invention.

In certain embodiments, timing generally means that the impact on the clock period, if the resources are shared, is estimated. This check can be done locally if there is a preliminary estimate of each resource's minimum and maximum start delay. The check may need to take into account the creation of false dependence paths that may prevent the synthesis tools from determining the real critical timing paths. A sample DFOG representation 800 of a datapath with a false dependence cycle is illustrated in FIG. 8. The DFOG implements two opcodes—ADM and MSB. ADM defines the expression f=(a+b)*d, while MSB defines the expression f=e(c*d). Since the ADM and the MSB decodes are one-hot signals, either the + or the − node is active but not both. Therefore, the real critical timing path would include the two conditional nodes, the multiplier and one add/subtract resource. However, if a synthesis tool does not have information about one-hot signals or is unable to fully analyze the datapath in the presence of one-hot signals, the critical timing path will be reported to include two add/subtract resources in stead of one, i.e., both the + and the − nodes will be assumed to be on the critical timing path.

Lastly, in certain embodiments, area generally means that resource sharing should attempt to reduce the hardware area. That is, the total area of the resources should be more than the area of the generated shared resource plus any additional area required for input and output selection minus the area of any logic that is optimized away once the resources are shared.

Seed datapath shareability information is collected and summarized to facilitate shared datapath generation. This information includes, external operand read and write stages, shareable resources along with their timing and area information, and opcodes (decode signals).

5. Merging Seed Datapaths

Given the set of all seed datapaths, the system decides which seed datapaths will be merged into shared datapaths (step 150). One way to produce the optimal set of shared datapaths is to attempt all possible seed datapath combinations. Since each seed datapath combination leads to a set of shared datapaths, the most efficient set of shared datapaths can be selected.

Alternatively, when there is a large number of seeds, a heuristic based approach described below can be employed. Initially, each seed datapath forms a separate datapath group. A group merge priority metric can be defined using, for example, the following seed group characteristics: compatible external operand schedules, shareable resources, and pipeline management logic.

For there to be compatible external operand schedules, the same external input operands cannot be used in different stages and the same external output operands cannot be defined in different stages. Additionally, in certain embodiments of the present invention, an output operand may not be defined (written) before a corresponding input operand is used (read) if the two operands correspond to the same register or state operand.

Likewise, for shareable resources, the number and the area and timing properties of shareable resources between the two datapath groups are combined into an objective function—higher objective function values lead to higher merge priority.

Finally, for pipeline management logic, sharing datapaths reduces the processor pipeline management and clock gating logic. The amount of saved pipeline management logic is included as a factor in the merge priority metric.

In certain embodiments, two seed groups can be merged by combining their datapaths, opcode sets, external input and output operand timing information and resource shareability data. If both seed groups use the same external input operand, the two operands are combined into a single operand in the merged datapath and its value is copied into the two original operands. If both seed groups use the same external output operand, the two operands are combined into a single operand in the merged datapath and its value is selected between the two original operands based on opcodes implemented by the two seed groups. In certain embodiments, a TIE_SEL module is used to select the output value of the shared operand.

Given a merge priority metric, a simple algorithm combines the two highest priority seed groups until no two seed groups have a merge priority metric greater than a fixed threshold (e.g., which can be zero). The system can then generate a shared datapath for each remaining seed datapath group.

6. Resource Sharing

Step 150 of the overall algorithm generates one combination of merged seed datapaths. This combination is either based on a heuristic guess about the possible shareable resources in the generated shared datapath, or is one of the combinations covered in an exhaustive search (step 170, below) over all possible seed datapath mergers. In certain embodiments of the inventions, based on each merged datapath, the system can generate an optimized shared datapath with hardware resources shared across opcodes (step 160). To share a resource, a shareable resource set is replaced by a new, shared resource. The inputs and the outputs of the shared resource are selected based on the decode signals corresponding to the opcodes that activate the separate resources in the shareable resource set.

One way to find the most efficient set of shared resources is to try to share all possible sets of shareable resources. At the end, the most efficient datapath implementation is selected.

Alternatively, when there are many shareable resources, a more practical, heuristic based approach based on a share-priority metric can be used. A share priority metric on a shareable resource set can be defined using, for example, resource timing and area properties.

For the area property, reduced datapath area increases the priority of sharing a resource. In addition to the actual resource area, the saved area also takes into account common input and output operands as well as the possibility to commute the operands of certain logic operators and modules. The amount of saved area is equal to the area of any logic optimized away by sharing the resources (including the logic area of the original resources) minus the area of the generated shared resource minus the area of any logic required for input selection.

For the timing property, shareable resources that have similar delays within the pipeline stage, as well as similar propagation delays, have higher share priority. Additionally, the system moves resources across stages, if possible, in order to increase the share priority metric.

In certain embodiments of the present invention, datapaths are represented as data-flow operand graphs, and hardware resources are represented as DFOG nodes. A heuristic-based algorithm to identify a high priority shareable node set BEST_NSET in DFOG D follows:

```
node set BEST_NSET = Ø;
for each node N ∈ D
{
    /* Find the best shareable node set that includes N. */
    node set NSET = { N };
    repeat
    {
        /* Find the node that increases the share priority
           of NSET the most, and add it to NSET. */
        node set SSET = Ø;
        for each node SN ∈ (D − NSET)
        {
            node set TSET = NSET ∪ { SN };
            if TSET is not a shareable node set, continue
            if PRIORITY_TSET > PRIORITY_SSET, SSET = TSET;
        }
        if SSET = Ø, break;
        NSET = SSET;
    }
    if PRIORITY_NSET > PRIORITY_BEST_NSET, BEST_NSET = NSET;
}
```

The system can then repeat the algorithm above to identify and share a shareable resource until no more shareable resource sets with share priority greater than a fixed threshold (e.g., which can be zero) are left.

Efficient Seed Datapath Sharing

After completing the resource sharing step of the shared datapath generation algorithm (step 160), the system generates a set of shared datapaths along with their timing and area properties. Depending on the number of seed datapaths, the system can repeat the seed datapath merging and the resource sharing steps of the algorithm (steps 150 and 160, respectively) to explore all possible seed datapath mergers exhaustively. At the end, the set of shared datapaths with the smallest hardware area is selected.

7. Software Performance Evaluation

In order to guide the shared datapath generation system, designers can specify a software performance goal (step 170) by providing a set of software applications. The software performance of the shared datapath is defined as an objective function of the execution times of the applications in the set, compiled and executed on the generated processor. Depending on the optimization goals, the system can either minimizes the value of the objective function or keeps the value below a fixed threshold.

To evaluate the software performance, the system customizes a processor using the selected shared datapaths, compiles each application onto the generated processor and uses a cycle-accurate instruction-set simulator to obtain the execution cycle count of the application. The execution time of the application is equal to the execution cycle count multiplied by the target clock period:

$$T_{EXEC} = T_{CLK} \times CYCLES_{EXEC}$$

In step 170, the system will need to reevaluate software performance for different operand schedules (step 130) as well as in cases when a resource is used in different pipeline stages in the same shared datapath causing pipeline hazards. Keeping the other parameters the same, the system reevaluates software performance for different target clock periods by simply replacing $T_{CLK}$ in the equation above.

8. Optimization Trade-offs

Shared datapath generation can be guided by different optimization goals (step 180), allowing designers to trade-off between maximal software performance and minimal hardware area. Hardware area is the total hardware logic area required by the processor. Software performance is defined by an objective function dependent on the execution times of one or more software applications. Software performance depends on a combination of the pipeline clock period TCLK and the schedule of the external signals that datapaths have access to (operand schedule). Smaller clock periods lead to better software performance. Generally, using input operands as late as possible in pipeline, and defining output signals as early as possible in the pipeline leads to better software performance. At the same time, fewer different use and def operand stages result in smaller area because of the reduced register bypass logic.

Designers can specify, for example, the maximum target hardware area, the maximum target clock period $T_{CLK}$, the required target operand schedule, the software performance target, or any combination of these parameters. The system minimizes hardware area, maximizes software performance and ensures that all parameters are within any specified limits. The system performs maximum hardware resource sharing based on the shared datapath generation algorithm described above by varying the target parameters that are not specified and repeating steps 130 through 170 of the algorithm—for each fixed set of limits, the seed datapaths are scheduled and merged into seed groups, a shared datapath is generated for each group, and software performance is evaluated, if necessary. At the end, the most efficient shared datapaths are selected.

9. Finalization

Lastly, the system generates an external representation of each shared datapath based on its internal representation (step 190). The external representation of a datapath can be the register transfer level description (RTL) that corresponds to the hardware implementation of the datapath. In certain embodiments of the present invention, a semantic construct is created for each datapath. The DFOG that represents the datapath is traversed and, for each node, an appropriate set of TIE expressions and statements is emitted as the body of the semantic.

The embodiments of the system and method disclosed in the preceding paragraphs includes implementations for processor pipelining. However, certain embodiments of the present invention need not be implemented using the pipelining aspects. Further, certain embodiments of the invention can use various aspects of the above-present embodiments to combine various operations and/or semantics to automatically generate a new semantic. For example, consider the FIGS. 9-12. As will become evident to those of ordinary skill in the art after reviewing these examples, many other combinations can be formed and such other combinations are meant to be within the scope of the invention.

Figure 9:
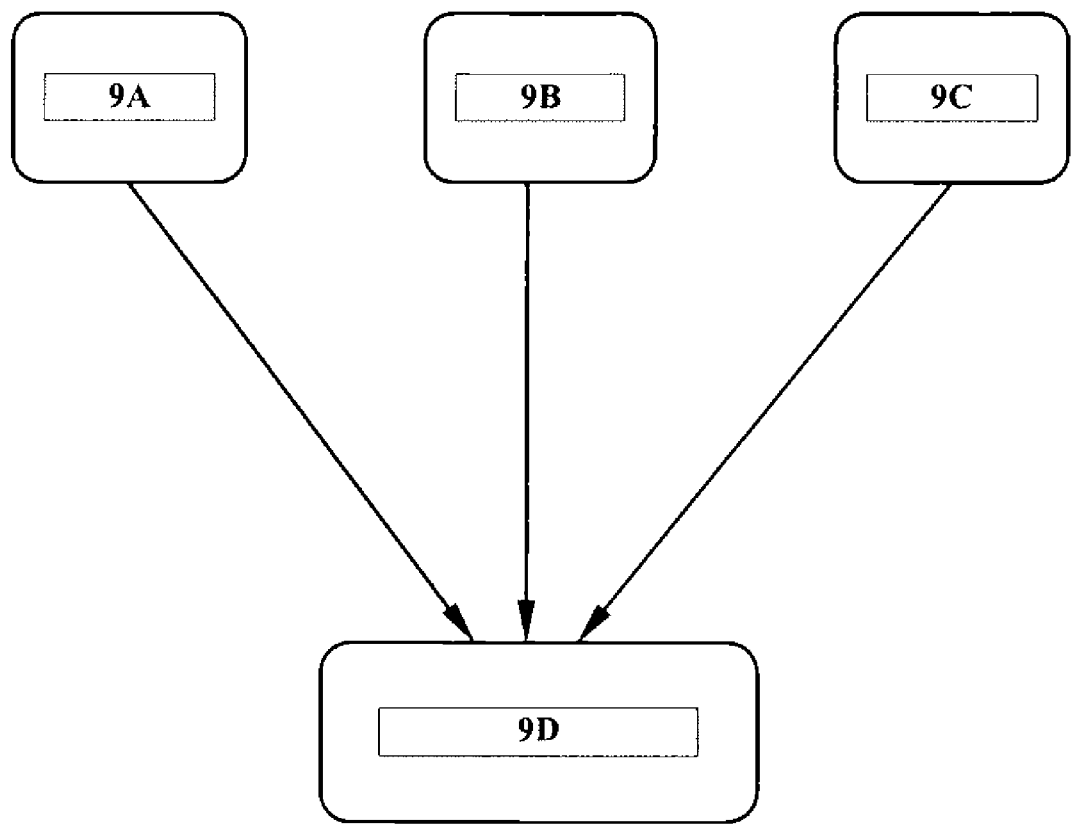
FIGS. 9-11 illustrate implementations of various embodiments of the present invention.

FIG. 9 illustrates an example of one or more operations being automatically combined into a single shared semantic according to certain embodiments of the present invention. As shown in FIG. 9, three operations 9A-C are automatically combined to form one shared semantic 9D.

Figure 10:
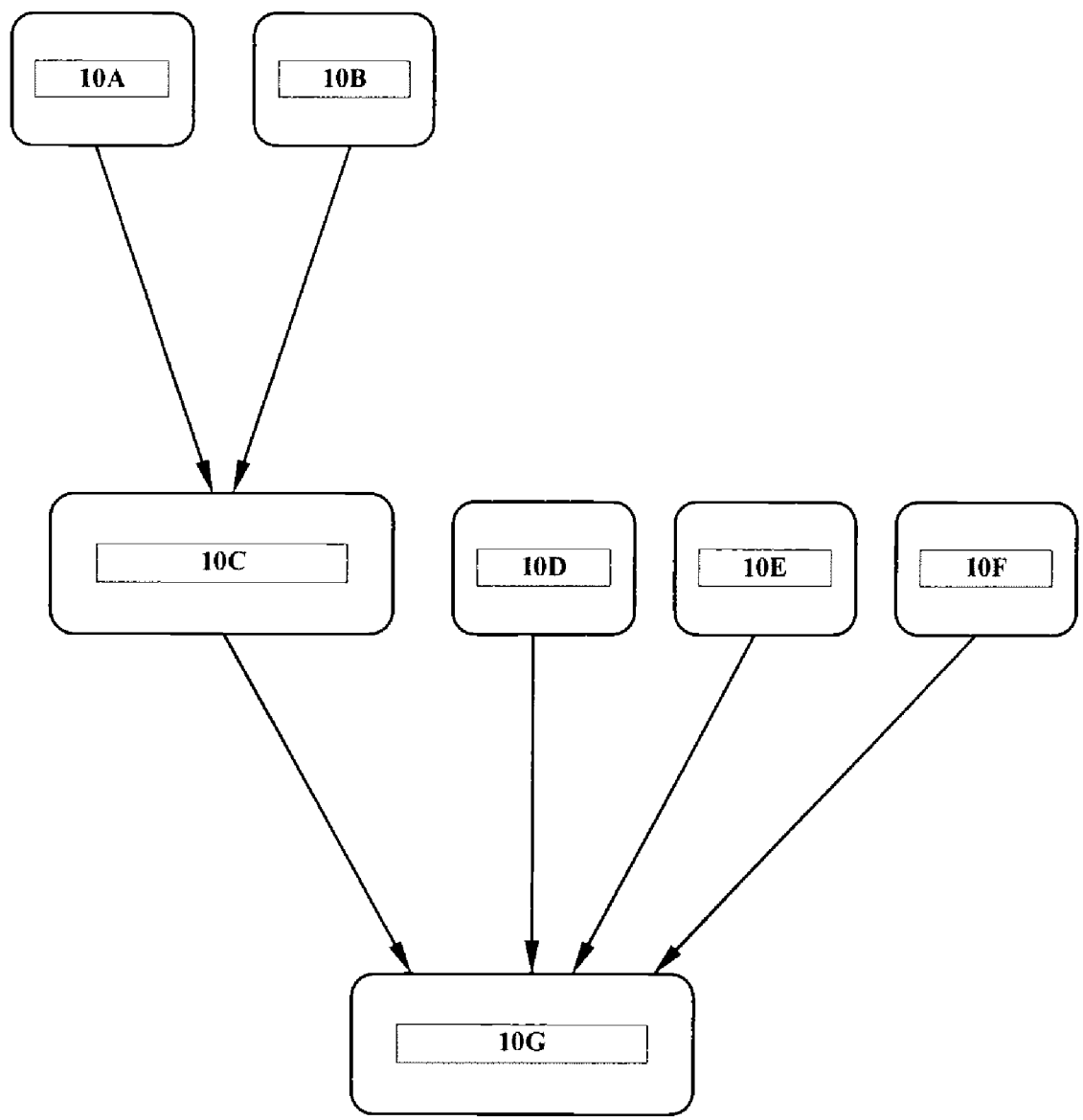

FIG. 10 illustrates an example of one or more operations and one or more shared semantics (i.e., either automatically created, manually created or combination thereof) being automatically combined into one or more shared semantics according to certain embodiments of the present invention. As shown in FIG. 10, two operations 10A-B are manually combined into a shared semantic 10C, which is then automatically combined with three other operations 10D-F to form a shared semantic 10G.

Figure 11:
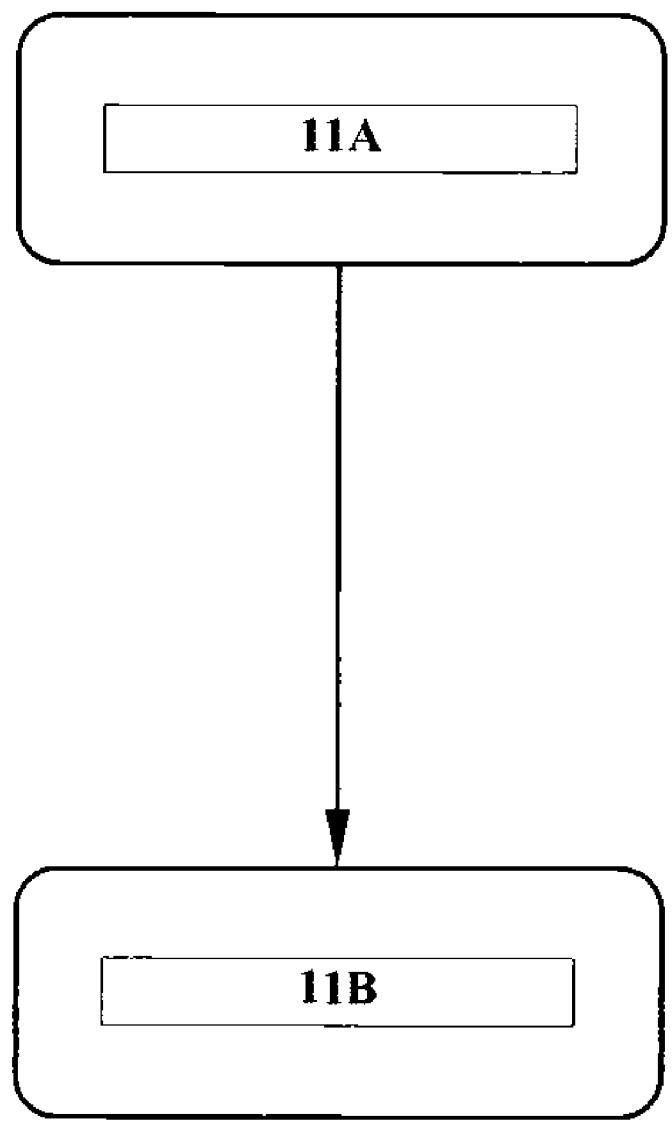

FIG. 11 illustrates an example of one or more manually created shared semantics being automatically combined into one or more shared semantics according to certain embodiments of the present invention. As shown in FIG. 11, a manually created semantic 11A is automatically combined (i.e., optimized) into a shared semantic 11B.

Although the present invention has been particularly described with reference to embodiments thereof, it should be readily apparent to those of ordinary skill in the art that various changes, modifications, substitutes and deletions are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of inventive elements illustrated and described in the above figures. An embodiment showing a singular component or step should not necessarily be considered as preventing the invention from encompassing the use of a plurality of that same component or step, and vice-versa, unless explicitly stated otherwise herein. It is intended that the scope of the appended claims include such changes and modifications.

What is claimed is:

1. A computer-implemented method comprising:
   identifying a set of operations to be executed by a processor, the set of operations including at least one of an instruction set architecture (ISA) base operation and a designer-defined extension operation, the set of operations further defining corresponding seed datapaths, the seed datapaths comprising processor resources including one or more of logic, area and timing;
   merging resources of seed datapaths corresponding to the identified set of operations into shared datapaths based on one or more merging metrics; and selecting an optimal set of shared datapaths based on an evaluation of the merged seed datapaths, the optimal set of shared datapaths being capable of supporting the identified set of operations, wherein one or more of the identifying, merging and selecting steps are implemented by the computer.

2. A computer-implemented method according to claim 1, further comprising:

forming a set of seed datapaths for the identified set of operations;

converting resources associated with the set of seed datapaths into canonical form; and collecting shareability information concerning the canonicalized resources, wherein the merging step is performed based on the collected shareability information regarding the canonicalized resources.

3. A computer-implemented method according to claim 2, wherein the step of forming the set of seed datapaths includes building a data-flow operand graph for one or more of the set of operations.

4. The computer-implemented method of claim 2, wherein the step of converting resources into canonical form includes assigning a legal pipeline schedule to each canonicalized seed datapath.

5. The computer-implemented method of claim 1, wherein the merging step includes the steps of:

identifying, automatically, shareable resources for the shared datapath; and sharing, automatically, the identified shareable resources among the at least one shared datapath.

6. The computer-implemented method of claim 5, wherein the merging step further includes maximizing the shared shareable resources.

7. The computer-implemented method of claim 1, further comprising, after the merging step, evaluating performance of at least one software program on the shared datapath.

8. The computer-implemented method of claim 7, further comprising generating an external representation for each of the at least one shared datapath selected for the optimal set.

9. The computer-implemented method of claim 1, further comprising generating an external representation for each of the at least one shared datapath selected for the optimal set.

10. A computer-implemented method according to claim 1, further comprising automatically generating a hardware description of the processor that incorporates the optimal set of shared datapath.

11. A computer-implemented method for the automatic generation of shared datapaths, the method comprising the steps of:

building, automatically, a data-flow operand graph for one or more operations to form a set of seed datapaths, the seed datapaths comprising processor resources including one or more of logic, area and timing, wherein the one or more operations is selected from a set of operations, the set of operations including an instruction set architecture (ISA) operation, an ISA base operation and a designer-defined extension operation;

canonicalizing, automatically, each seed datapath;

collecting, automatically, resource shareability data for each canonicalized seed datapath;

merging, automatically, the collected seed datapaths into at least one shared datapath; and selecting, automatically, the optimal set of shared datapaths, wherein one or more of the building, canonicalizing, collecting, merging and selecting steps are implemented by the computer.

12. The computer-implemented method of claim 11, wherein the step of automatic canonicalization includes the step of assigning a legal pipeline schedule to each canonicalized seed datapath.

13. The computer-implemented method of claim 11, wherein the step of automatic merging includes the steps of:

identifying, automatically, shareable resources for the at least one shared datapath; and sharing, automatically, the identified shareable resources among the at least one shared datapath.

14. The computer-implemented method of claim 13, further comprising the automatic step of iteratively performing the steps of automatic merging, identifying and sharing to maximize the shared shareable resources.

15. The computer-implemented method of claim 14, further comprising, after the step of automatic merging, the step of evaluating performance of at least one software program on the at least one shared datapath.

16. The computer-implemented method of claim 15, further comprising the automatic step of iteratively performing the steps of automatic collecting, merging, identifying, sharing and evaluating to optimize the optimal set.

17. The computer-implemented method of claim 16, further comprising the step of generating an external representation for each of the at least one shared datapath selected for the optimal set.

18. The computer-implemented method of claim 11, further comprising, after the step of automatic merging, the step of evaluating performance of at least one software program on the at least one shared datapath.

19. The computer-implemented method of claim 11, further comprising the step of generating an external representation for each of the at least one shared datapath selected for the optimal set.

* * * * *